Figure 1:
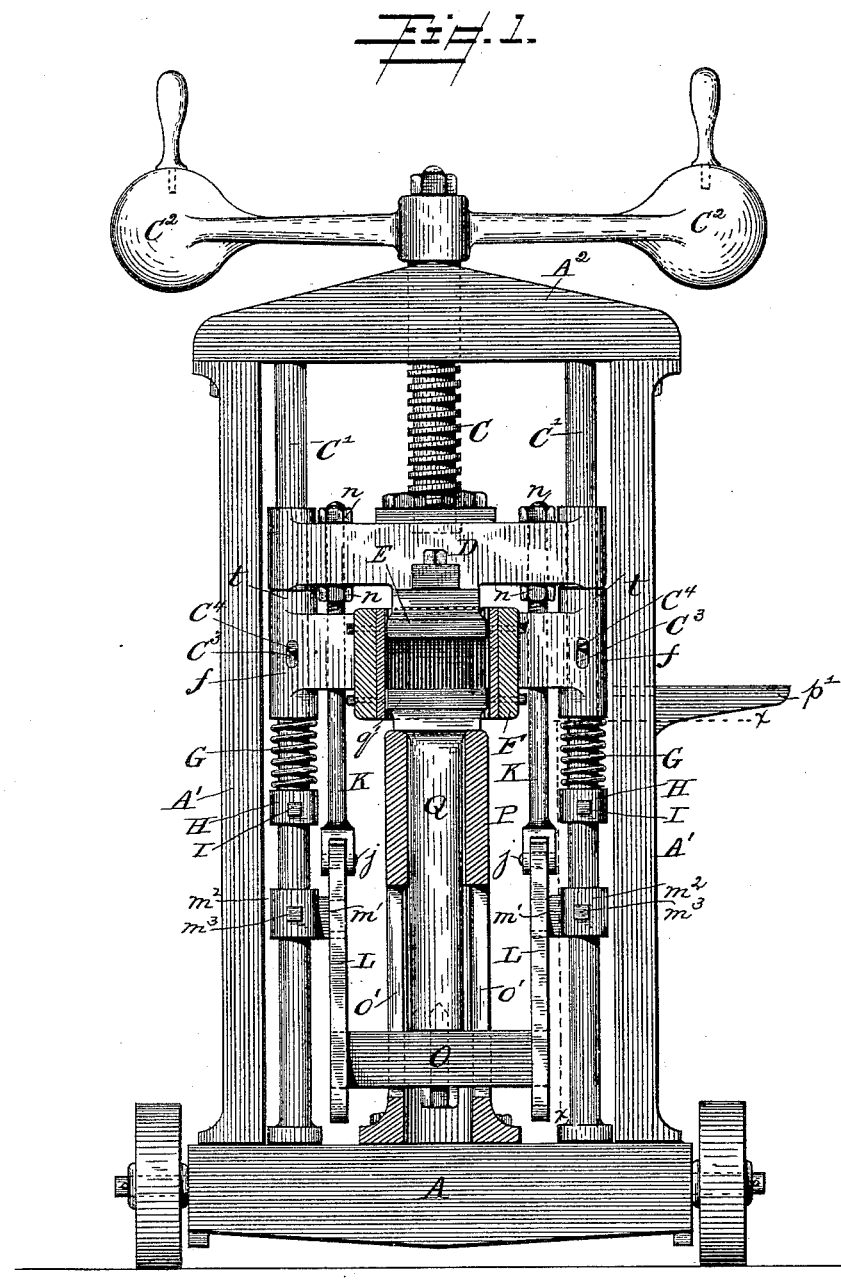

(No Model.) 3 Sheets—Sheet 1.

W. L. GREGG.
RE-PRESSING AND MOLDING MACHINE.

No. 419,043. Patented Jan. 7, 1890.

Witnesses
Jos H Blackwood
W. G. Doolittle.

Inventor
Wm L. Gregg
By his Attorney
Wm H Doolittle.

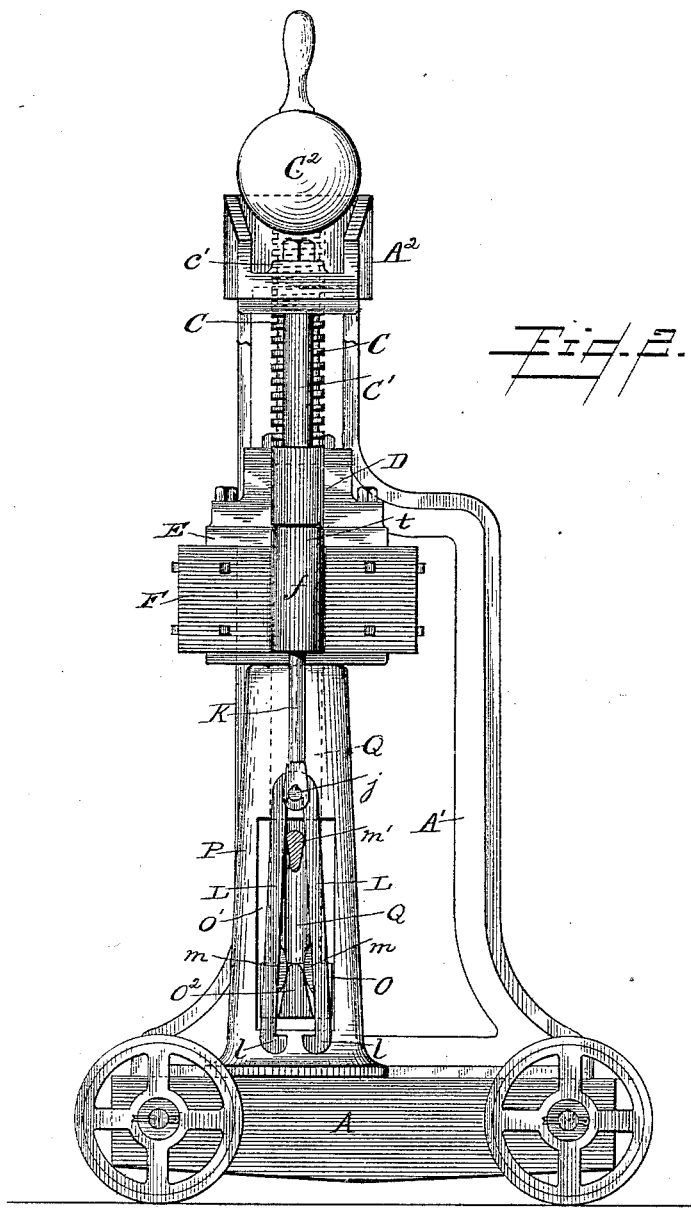

(No Model.) 3 Sheets—Sheet 3.
W. L. GREGG.
RE-PRESSING AND MOLDING MACHINE.
No. 419,043. Patented Jan. 7, 1890.
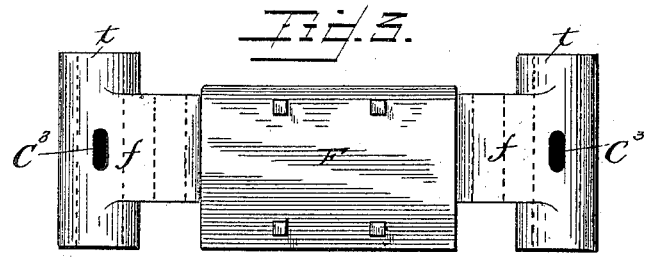
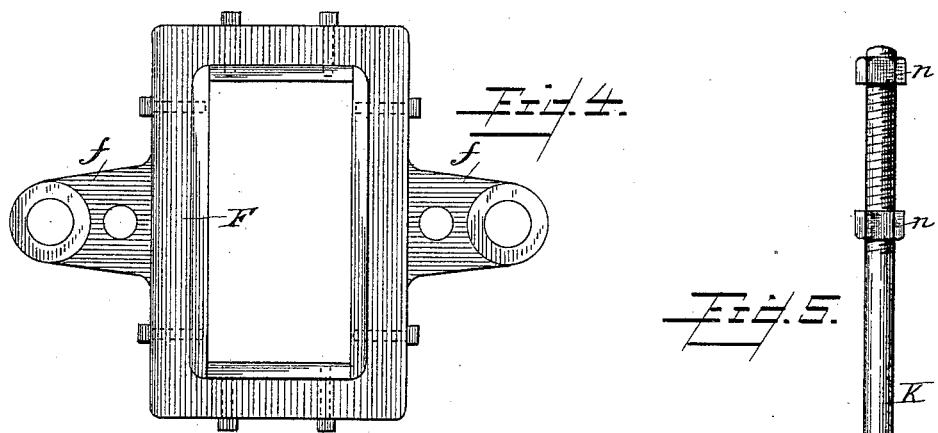
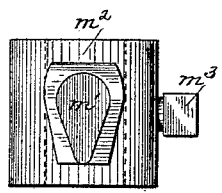
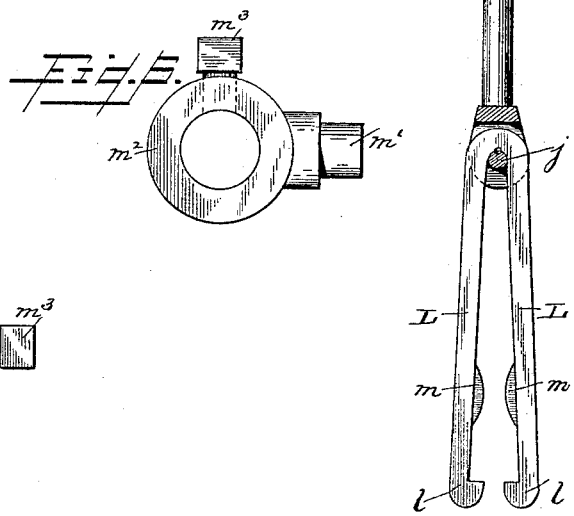
Witnesses
Jas H Blackwood
W. G. Doolittle
Inventor
Wm L. Gregg
By his Attorneys
Wm H Doolittle

UNITED STATES PATENT OFFICE.

WILLIAM LAMPAS GREGG, OF PHILADELPHIA, PENNSYLVANIA.

RE-PRESSING AND MOLDING MACHINE.

SPECIFICATION forming part of Letters Patent No. 419,043, dated January 7, 1890.

Application filed July 1, 1889. Serial No. 316,248. (No model.)

*To all whom it may concern:*

Be it known that I, WILLIAM LAMPAS GREGG, a citizen of the United States, residing at Philadelphia, in the county of Philadelphia and State of Pennsylvania, have invented certain new and useful Improvements in Re-Pressing and Molding Machines; and I do hereby declare the following to be a full, clear, and exact description of the invention, such as will enable others skilled in the art to which it appertains to make and use the same.

The object of my invention is the improvement of machines for the manufacture of ornamental shaped brick, tiles, and other similar clay products and for re-pressing brick and other articles made from clays by rendering the same more simple and efficient in construction and operation.

It consists in the features and combinations of features hereinafter described and claimed, and as illustrated in the accompanying drawings, in which—

Figure 1 is a view in elevation of the front end of the machine, a part being shown in section. Fig 2 is a vertical section of the same on the line $x\ x$ of Fig. 1; and Figs. 3, 4, 5, 6, and 7 are details.

The machine is placed on wheels to facilitate its movement from place to place. The frame of the machine consists of the bed-plate A, standards or housings A', and a top cross-cap $A^2$.

C is a screw engaging with a screw-boss $c'$ on cross-cap $A^2$, and provided with weighted arms $C^2$, by which the same is rotated. The lower end of the screw engages with a movable cross-head D and rotates freely in a recess in said cross-head, so as to be raised and lowered without rotating the latter.

E is a short plunger bolted to the cross-head D, provided with a steel face-plate and adapted to fit neatly within a mold-box F. The cross-head D slides on guide-rods C', secured to the top and bottom cross-plates.

The mold-box is provided with a steel lining, and is cast in one piece with lugs $f$, through which the guide-rods C' pass and slide. The mold-box rests upon springs G. These springs encircle the rods C' and are set on collars H, and the collars are secured to the rods by means of set-screws I I. The force of the compression of the springs against the mold-box is regulated by a proper setting of the collars on the rods.

The movement of the mold-box on rods C', for the purpose hereinafter described, is limited by means of slots $C^3$ engaging with pins $C^4$ on rods C'.

K are adjustable suspension-rods secured to cross-head D, passing loosely through lugs $f$ of the mold-box, and are forked at their lower ends. Between these forks are hung on a pin $j$ spring hoisting-grips L. These grips consist each of a single piece of stiff spring-steel bent at the center to form two arms of equal length and terminating in inwardly-projecting jaws or hooks $l\ l$. They are hung on pin $j$ at their bend, and are provided with cheeks $m\ m$—one on the inner side of each arm.

$m'$ are pear-shaped adjustable projections on rods C', by which the grips are spread apart when the cheeks $m$ engage therewith, as hereinafter described. They are cast on collars $m^2$, which are set by screws $m^3$ to regulate the matter of tripping as to time. The rods K are made adjustable as to length by means of nuts $n$.

O is a lower cross-head placed through and guided by slots O', formed in a stationary box P, bolted to the bed-plate.

$O^2$ are projecting lugs in the cross-head, with which the hooks $l\ l$ of the grippers L are adapted to engage.

Q is the lower plunger connected to cross-head O, moving within and guided by the box P, and provided with a steel pressure face-plate $q'$.

The lugs on the mold-box are provided with blocks $t$, against which the upper cross-head presses to force the mold-box down, as and for the purpose hereinafter described.

The operation of the machine is as follows: The brick or other article to be pressed is fed into the mold-box from platform $p'$ and rests upon the top of the lower plunger, which in effect constitutes the bottom of the mold-box. Then by turning the screw by the weighted handles the upper cross-head and follower are carried down on rods C'. The follower is forced against the brick and the latter against the lower plunger, and so far as the mere fact of re-pressing the body of the brick is concerned the operation is now completed; but, the downward pressure of the upper cross-head being continued, the mold-box is forced down by the pressure of the cross-head on the projection $t$ onto the springs on which it rests until stopped by the pins or rods C'. This additional pressure forces the mold-box down along the sides and ends of the brick, thus smoothing the sides and ends and further solidifying the edges. In the meantime, while the upper plunger is descending, the gripper-arms have been carried down and their hooks engaged with the projecting blocks on the lower cross-head, and when the screw is rotated in the opposite direction to carry the upper plunger up the lower plunger is raised until the brick or other article is carried above the mold-box and to a level with the platform, when it is removed. The cheeks on the gripper-arms then come in contact with the lugs $m'$ on the rods C', are forced apart, and the lower plunger and cross-head thus disengaged from the grippers are permitted to fall by gravity. The mold-box, when the pressure of the upper cross-head is relieved therefrom, is forced up to its normal position under the upper plunger by the action of the springs on which it rests, and again smoothing the sides and ends of the brick. It will thus be seen that the entire operation of molding, re-pressing, and presenting the article for discharge is performed by the action of the screw-lever.

It will be noticed that the mold-box is placed flat and not edgewise on its supporting-springs between the plungers, and that the brick is placed and pressed therein in a corresponding position, and also that the mold-box does not move against the stationary box inclosing the lower plunger, but that, as shown in Fig. 1, which represents the apparatus at the close of the operation, the mold-box is always held above contact with the stationary box, and the top of the lower plunger is always within the mold-box.

It is obvious that my machine may be put to other uses than re-pressing brick, and that it may be used for molding brick or other articles made from clays or other plastic material.

What I claim is—

1. The combination, in a re-pressing and molding machine, with the frame, of a sliding mold-box, the guide-rods on which the said box slides, springs on said rods pressing against said mold-box, a cross-head and upper plunger, and a screw secured to said cross-head, substantially as and for the purpose described.

2. The combination, with the frame, of the guide-rods, the adjustable spiral springs on said rods, and the mold-box sliding on said rods and supported by said springs, substantially as and for the purpose described.

3. The sliding mold-box provided with the lugs $f$ and slots $C^3$, in combination with the guide-rods C', passing through said lugs, and pins $C^4$ on the rods to limit the movement of the box on said rods in connection with the slots, substantially as described.

4. In combination with the stationary lower plunger-box provided with slots in its sides, the lower cross-head extending through said slots, the rods provided with grips to engage with said cross-head, the plunger within said box secured to said cross-head, and means for raising said grippers and cross-head, substantially as described.

5. The combination, with the rods, such as C', provided with the pear-shaped projections, of the suspension-rods, the grippers hung on the latter and provided with the cheeks to engage with said projections, whereby the grippers are spread apart, the upper cross-head to which the suspension-rods are secured, and means for raising and lowering said cross-head, substantially as described.

6. The combination of the upper cross-head, plunger, and screw with the mold-box provided with lugs and upper-extending projections, whereby when the plunger is forced down into the mold-box its entire length the mold-box will be forced farther down by the cross-head, substantially as and for the purpose described.

In testimony whereof I affix my signature in presence of two witnesses.

WILLIAM LAMPAS GREGG.

Witnesses:
 R. E. EGGLESTON,
 R. M. GREINER.